US005526856A

United States Patent [19]
Pedri

[11] Patent Number: 5,526,856
[45] Date of Patent: Jun. 18, 1996

[54] DEVICE FOR SUPPORTING WORKPIECE FOR A PORTABLE POWER TOOL

[76] Inventor: Attilio Pedri, 3523 Government Rd., Thunder Bay, Ontario, Canada, P7B 5E3

[21] Appl. No.: 495,170

[22] Filed: Jun. 27, 1995

[51] Int. Cl.⁶ .......................... B27C 09/02; B27B 25/10
[52] U.S. Cl. .................. 144/287; 144/286.1; 83/471.3
[58] Field of Search .................. 108/65, 144, 55.3, 108/67, 69, 139; 182/179, 183, 204, 223; 144/286 R, 287; 83/574, 471.3, 471.2, 471

[56] References Cited

U.S. PATENT DOCUMENTS

| | | |
|---|---|---|
| 1,864,840 | 6/1932 | Lehner ........................ 144/287 |
| 2,551,611 | 6/1951 | Borgman ................ 144/286 R |
| 4,694,720 | 9/1987 | Brickner, Jr. et al. . |
| 4,798,113 | 1/1989 | Viazanko .................. 83/471.3 |
| 4,817,693 | 4/1989 | Schuler . |
| 4,860,807 | 8/1989 | Vacchiano . |
| 4,964,449 | 10/1990 | Conners . |
| 4,974,651 | 10/1990 | Carmon et al. . |
| 4,987,813 | 4/1991 | Viazanko . |
| 5,004,029 | 4/1991 | Garner . |
| 5,038,650 | 8/1991 | Hodge . |
| 5,105,862 | 4/1992 | Skinner et al. .......... 144/287 |
| 5,115,847 | 5/1992 | Taber ...................... 144/286 A |
| 5,193,598 | 3/1993 | Estrem .................... 144/287 |
| 5,320,150 | 6/1994 | Everts et al. .......... 144/286 A |
| 5,421,231 | 6/1995 | Brenic et al. .......... 144/286 A |

*Primary Examiner*—W. Donald Bray
*Attorney, Agent, or Firm*—Hoffman, Wasson & Gitler

[57] ABSTRACT

An apparatus for supporting a workpiece is provided, and attaches to a workbench vice. The apparatus is used in conjunction with a portable power tool and provides support to long workpieces. The apparatus can be extended away from the workbench to accommodate workpieces of varying lengths, and can be vertically adjusted to provide support at a height substantially equal to the height of a working surface of the portable power tool.

17 Claims, 4 Drawing Sheets

DEVICE FOR SUPPORTING WORKPIECE FOR A PORTABLE POWER TOOL

BACKGROUND OF THE INVENTION

1. Field of the Invention

The present invention relates to a workpiece support which can be attached to almost any workbench vice, and which can be extendable. More particularly, the support of the present invention can be used with any workbench having a vice, and which supports a portable power tool, such as a portable radial arm saw or a mitre saw, commonly used in carpentry or a trade requiring supports for long pieces of material. The device of the present invention allows a single person to stabilize and cut long workpieces, i.e., aluminum, vinyl, wood, steel, etc. Further, the device can be extended, in either the left right or both directions of the workbench vice to permit longer lengths of material to be cut.

2. Description of the Prior Art

The portability of power tools is a useful feature to most operators. Portable power saws generally have short horizontal workpiece support platforms, which make stabilizing a workpiece difficult during a cutting operation. Extensions have been used to prevent the workpiece from sagging and thereby helping to produce a clean accurate cut.

Most portable power tools can be secured to a workbench vice that is either stationary or portable, such as the workbench sold under the tradename "Workmate" and manufactured by Black & Decker, Inc. The ability to secure the portable tool solves the problems associated with creating a working surface at a height that is comfortable and safe for the operator. However, due to the limited working surface of the power tool a support or a second person is often required to stabilize a workpiece that is longer than the limited support surface of the tool.

Power tool operators often need to repetitively produce workpiece cut to the same length. Each workpiece must be measured and marked, a procedure which is time consuming and subject to error.

Various devices have been developed to support long workpieces. For example, U.S. Pat. No. 1,864,840 to Lehner teaches an adjustable stock support bracket. Right and left supports are provided, but they are designed for use with the particular workstation illustrated, not a portable power tool, and are not adaptable to different tools. Furthermore, two separate arms are needed to accommodate a workpiece extending outwardly on both sides.

U.S. Pat. No. 5,105,862 to Skinner et al discloses extensions for a material support platform of a tool. While the extensions can be used with a portable tool, separate extensions are required on each side. The length of the extensions is not adjustable, and vertical legs are required to support the extensions.

Estrem, U.S. Pat. No. 5,193,598 pertains to a portable support stand which attaches to a sawhorse. The support stand supports both the workpiece and the portable power tool. The device is attached to a sawhorse and separate right and left arms are attached to the support stand by brackets.

All of the foregoing devices have deficiencies. The devices are bulky and not easy to transport, or set up. The ability to adjust a wide range of workbenches and power tools is not met sufficiently.

SUMMARY OF THE INVENTION

Based on the foregoing, it is an object of the present invention to provide a support device which is adaptable to different power tools and can be utilized on various workbenches.

Another object of the present invention is to provide a support device which is easy to transport and assemble.

Yet another object of the present invention is to provide a support device which can provide a positive stop for repetitive work on multiple workpieces.

Another object of the present invention is to provide a support device having brackets which can be moved relative to the power tool to accommodate different length workpieces and which can be vertically adjusted to match the height of work surfaces of different power tools.

These and other deficiencies of the prior art are addressed by the present invention which is directed to a workpiece support, which clamps into a vice that is part of a workbench, and has a linear member or portion extending to one or both sides of the workbench. The support has one or two support brackets projecting upward from the linear member so that workpieces which are substantially longer than the working surface of a portable power tool, mounted on the workbench, are provided adequate support. The linear member make be extendable and the brackets are vertically adjustable.

BRIEF DESCRIPTION OF THE DRAWINGS

These and other attributes of the present invention will be described with respect to the following drawings in which.

DETAILED DESCRIPTION OF THE INVENTION

Figure 1:
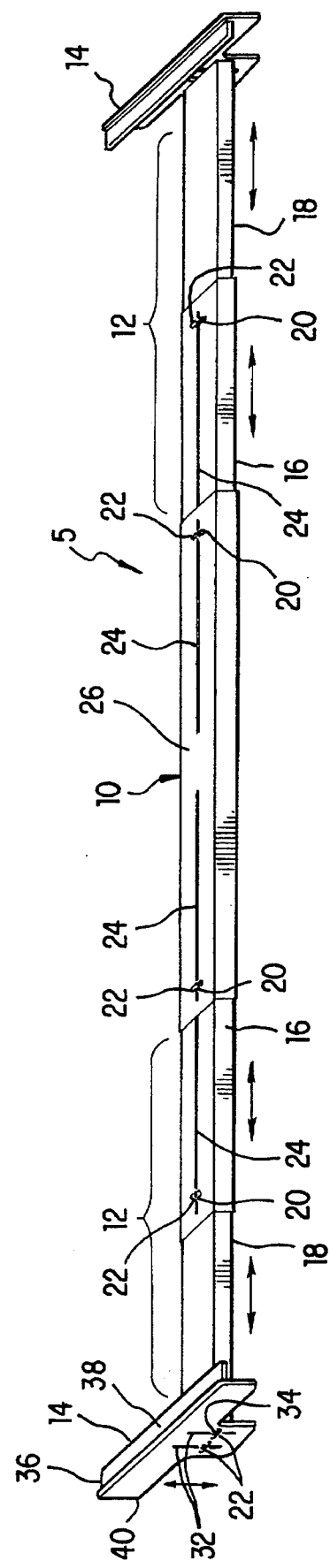
FIG. 1 is a perspective view of a first embodiment of the invention.
Figure 2:
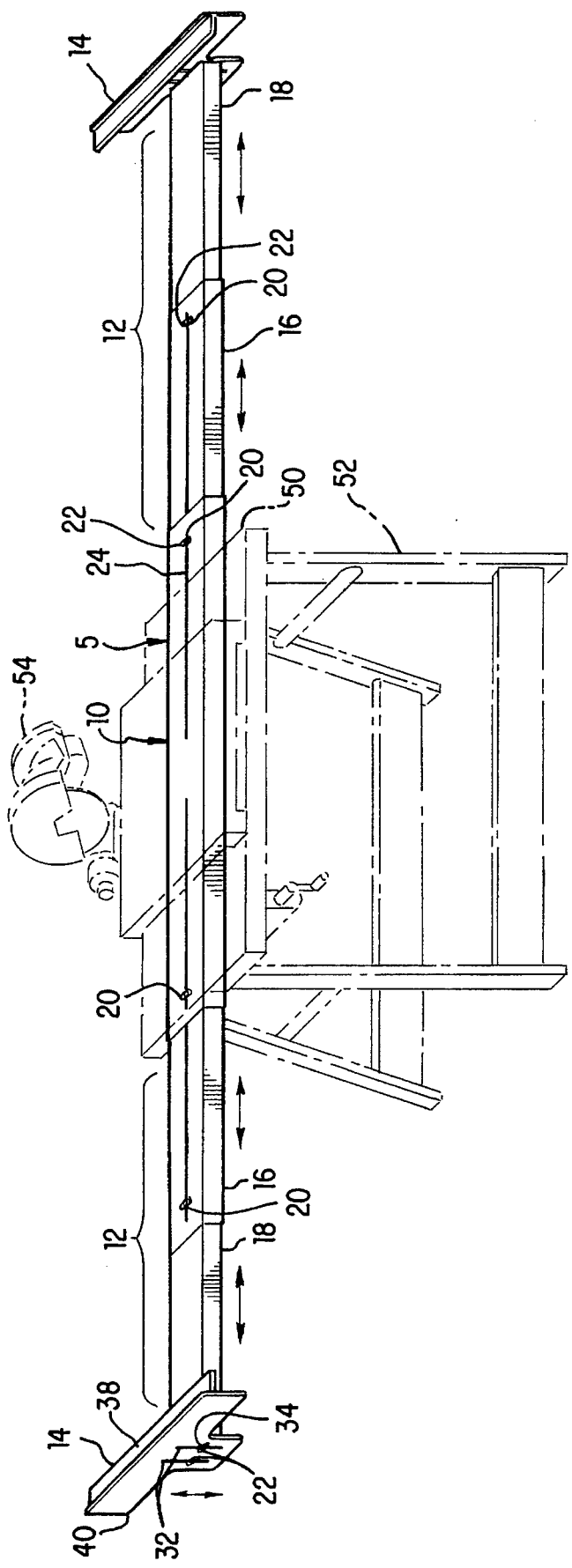
FIG. 2 is a perspective view of the embodiment shown in FIG. 1, with a workbench and portable power tool shown in phantom.

Referring to FIGS. 1 and 2, a first embodiment of the present invention is shown. The support 5 includes a central member 10, extensions 12 and workpiece support brackets 14. The central member 10 and extensions 12 are rectangular in cross-section. As shown in FIG. 2, the central member 10 is clamped in a vice 50 of a workbench 52, when in use. The rectangular cross-section of the central member 10 facilitates such clamping.

Each extension 12 telescopes into central member 10. The extensions 12 can each be a single member, or as shown in FIG. 1, can include an intermediate section 16 and an end section 18. The intermediate section 16 telescopes into the central member 10, and the end section 18 telescopes into the intermediate section 16. While the illustrated embodiment shows extensions 12 on both sides of the central member 10, a single extension 12 on only one side is an acceptable alternative for workpieces which extend predominantly in only one direction relative to the portable power tool when being worked on by the power tool 54.

The extensions 12 can be fixed or locked in a desire position using bolts 20 and nuts 22. The central member 10 has a pair of slots 24 formed in its upper surface 26, and extending lengthwise therein. Each extension 12 has a bolt 20 extending upwards so that it projects through one of the slots 24 in the central member 10. Where intermediate sections 16 and end sections 18 are employed, the intermediate section has a longitudinal slot 24 in its upper surface and a bolt 20 extending through the slot 24 in the central member 10. The end section 18 has a bolt 20 projecting upward through the slot 24 in the intermediate section 16. The sections 16 and 18 are locked in place using nuts 22, preferably wing nuts, on the bolts 20.

Support brackets 14 are attached to ends of the extensions 12. For the embodiment shown in FIGS. 1 and 2, the brackets 14 are attached to end sections 18. Brackets 14 have vertical slots 32 formed therein and are attached with bolts 34, which extend outward away from the central member 10, and wing nuts 22. While two bolts 22 and two slots 32 are shown, a single slot 32 and bolt 22 arrangement can be employed, The vertical adjustability allows the support device of the present invention to be used with a wide variety of different makes of portable power tools with different work surface heights.

The brackets 14 each have an L-shaped stop 36 formed by a horizontal surface 38 and vertical wall 40. When numerous workpieces are to be cut, drilled, or otherwise worked to identical dimensions, the stops 36 allow the operator to place the workpieces on the working surface of the power tool and position it on the horizontal surface 38 to abut the vertical wall 40 thereby ensuring that each piece is positioned in the same position relative to the portable power tool.

The L-shaped stops 36 make it easy for the operator to repetitively cut workpieces to identical dimensions in a minimal amount of time.

Once the central member 10 is viced in place, the support 5 is self-supporting, in that no vertical legs are required to shore up the extensions 12.

Figure 3:
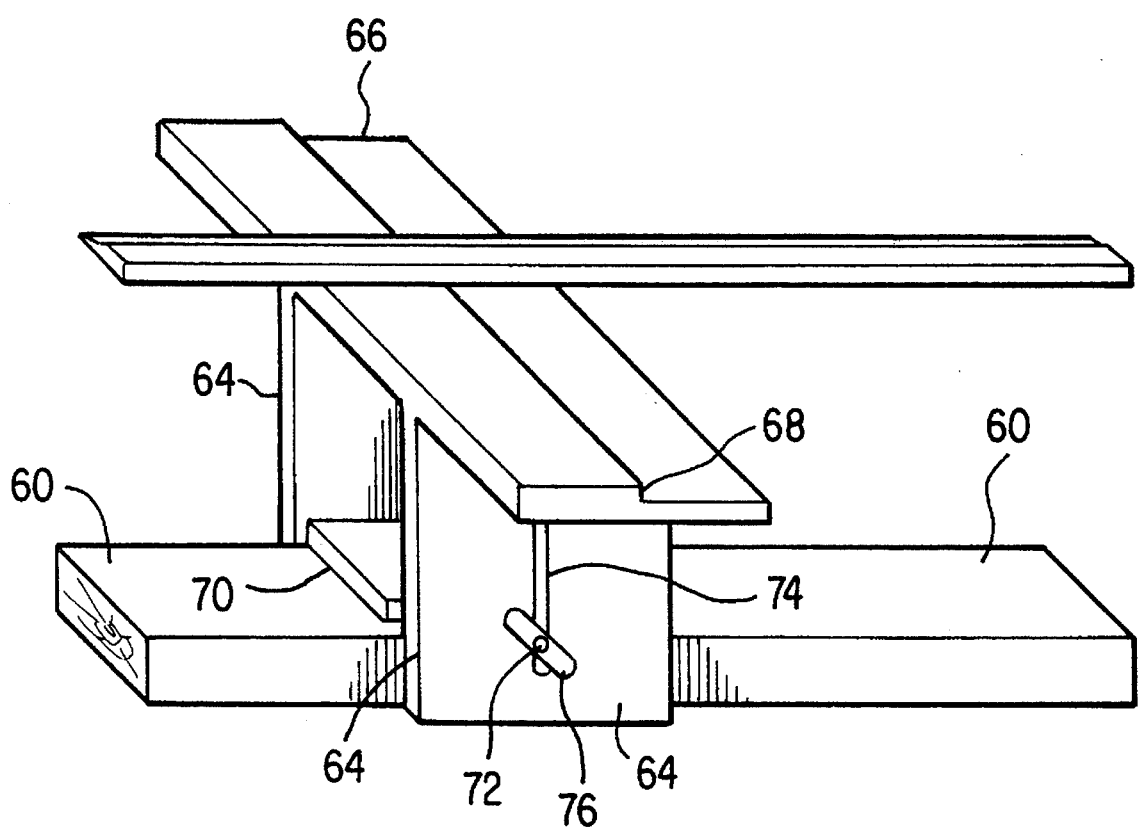
FIG. 3 is a perspective view of a second embodiment of the invention.
Figure 4:
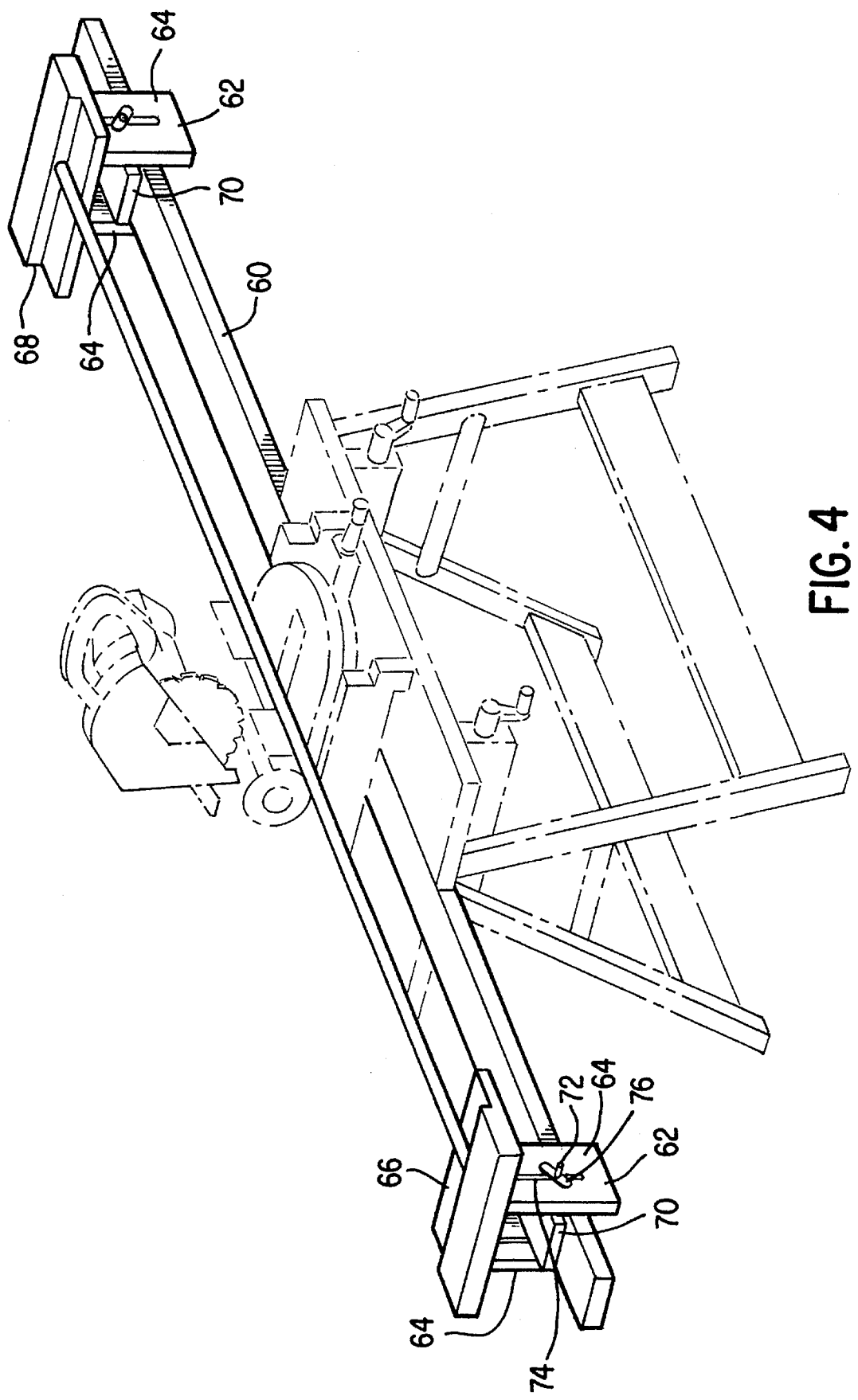
FIG. 4 is a perspective view of the embodiment shown in FIG. 3, with a workbench and portable power tool shown in phantom.

A second embodiment of the present invention is shown in FIGS. 3 and 4. In this embodiment, the central member 10 and extensions 12 of the first embodiment are replaced by a linear member 60. Typically, a wooden 2'×4' can be used as the linear member 60. Such 2'×4's are commonly found at construction sites, and the length of the 2'×4' can be selected depending upon the lengths of workpieces to be machined.

Support brackets 62 are movably secured to the linear member 60. Each bracket 62 has a pair of vertical side walls 64, an upper horizontal surface 66, a vertical wall 68, and a stabilizing plate 70. The horizontal surface 66 supports an end of the workpiece and is connected to the upper ends of the side walls 64. The stabilizing plate 70 rests upon the linear member 60 that is to be inserted into the support bracket 62, between the side walls 64. The stabilizing plate 70 prevents forward and backward rocking movement of the support bracket 62. The stabilizing plate 70 has a bolt 72 extending outward from opposite sides. Each side wall 64 has a vertical slot 74 through which the bolts 72 extend.

The support brackets are locked in position, both at the desired location along the linear member 60 and at a desired height by tightening nuts 76, preferably wing nuts, onto the bolt 72. As an alternative, the stabilizing plate or member 70 can be replaced by a single bolt 72.

Vertical wall 68 extends upward from the horizontal surface 66, at substantially 90° to one another. The vertical wall 68 and horizontal surface 66 form an L-shaped stop which performs the same function as the L-shaped stop 36 of the first embodiment, namely providing the operator an easy guide for making repetitive cuts to workpieces to yield identical dimensions.

The distance between the pair of side walls 64 is substantially equal to the width of the 2'×4' or other linear member 60. The distance between the walls 64 must be close enough to the width of the linear member 60 so that tightening of the nuts 76 or bolts 70 will maintain the position of the support bracket 62.

The support brackets 62 can be made from metal, wood, plastic or other sufficiently rigid material. Furthermore, the linear member 60 may also be made from such sufficiently rigid material. The central member 10 of the first embodiment is preferably made of metal, as are the intermediate sections 16 and end sections 18. For both embodiments, the device collapses to a relatively small size or can be disassembled into small components, making it easy to transport the device. If the device was bulky, it would inhibit the portability feature of the portable power tool.

Having described several embodiments of the support in accordance with the present invention, it is believed that other modifications, variations and changes will be suggested to those skilled in the art in view of the description set forth above. It is therefor to be understood that all such variations, modifications and changes are believed to fall within the scope of the invention as defined in the appended claims.

What is claimed is:

1. An apparatus for supporting a workpiece, said apparatus being attachable to a workbench vice, for use with a portable power tool mounted on said workbench, comprising:

a central member clamped in said workbench vice;

a pair of extensions connected to said central member and which can be extended in opposite directions from said central member to project away from sides of said workbench;

means for locking said pair of extensions in desired positions; and at least one workpiece support bracket extending vertically upward from one of said pair of extensions, said bracket being vertically adjustable to support said workpiece at a height substantially equal to a working surface of said portable power tool.

2. An apparatus as recited in claim 1, wherein each of said pair of extensions has a support bracket extending therefrom.

3. An apparatus as recited in claim 1, wherein said at least one workpiece support bracket is disposed at an end of said one of said pair of extensions.

4. An apparatus as recited in claim 1, wherein said pair of extensions fit inside said central member in a non-extended position, and telescope to extend from said central member in an extended position.

5. An apparatus as recited in claim 4, wherein said locking means comprises a pair of slots disposed lengthwise in said central member and bolts projecting from said pair of extensions through said pair of slots, and wing nuts attached to said bolts.

6. An apparatus as recited in claim 1, wherein said pair of extensions each comprise:

an intermediate section and an end section, said intermediate section being disposed in said central member in a non-extended position, and said end section being disposed in said intermediate section in said non-extended position.

7. An apparatus as recited in claim 1, wherein said at least one workpiece support bracket has an L-shaped stop, on an upper surface, to support said workpiece and provide a fixed position for said workpiece relative to said portable power tool.

8. An apparatus as recited in claim 1, wherein said at least one workpiece support bracket has at least one vertical slot, and each of said pair of extensions has a bolt projecting from an end opposite said central member, said bolt extending through said at least one vertical slot, and wherein height of said bracket is vertically adjusted by moving said bracket vertically and locking a nut on said bolt.

9. An apparatus as recited in claim 4, wherein in said non-extended position, said apparatus has a length substantially equal to the length of said central member.

10. An apparatus for supporting a workpiece, said apparatus being attachable to a workbench vice, for use with a portable power tool mounted on said workbench, comprising:

a linear member clamped in Said workbench vice to extend horizontally from at least one side of said workbench, at least one support bracket movable horizontally on said linear member and extending vertically upward from said linear member, for supporting said workpiece at a height substantially equal to a working surface of said portable power tool, and means for locking said at least one bracket at a desire position along said linear member.

11. An apparatus as recited in claim 10, wherein said linear member is a 2"×4".

12. An apparatus as recited in claim 10, wherein said at least one support bracket is vertically adjustable.

13. An apparatus as recited in claim 12, wherein said at least one support bracket comprises:

a pair of vertical side walls;

a workpiece support surface disposed on upper ends of said pair of side walls, and a stabilizing member disposed between said pair of side walls and resting upon said linear member.

14. An apparatus as recited in claim 13, wherein said locking means comprises:

a vertical slot in each of said pair of side walls, a pair of bolts extending from said stabilizing member through said vertical slot, and a pair of nuts for locking said stabilizing member in a desired vertical position relative to said side walls, and for locking said side walls against said linear member to fix said at least one bracket in a desired position along said linear member.

15. An apparatus as recited in claim 14, wherein a distance between said pair of side walls is substantially equal to a width of said linear member.

16. An apparatus as recited in claim 10, wherein said at least one bracket has an L-shaped stop on an upper surface to support said workpiece and to provide a fixed position for said workpiece relative to said portable power tool.

17. An apparatus as recited in claim 10, comprising two workpiece support brackets, one on either end of said linear member.

* * * * *